United States Patent
Peyman et al.

(10) Patent No.: US 12,518,860 B2
(45) Date of Patent: Jan. 6, 2026

(54) APPARATUS AND METHOD FOR CALCULATING AN OPTIMUM MEDICATION DOSE

(71) Applicants: Nazmi Peyman, Richmond, VA (US); Edmond Zahedi, Burnaby (CA)

(72) Inventors: Nazmi Peyman, Richmond, VA (US); Edmond Zahedi, Burnaby (CA)

(*) Notice: Subject to any disclaimer, the term of this patent is extended or adjusted under 35 U.S.C. 154(b) by 351 days.

(21) Appl. No.: 17/534,262

(22) Filed: Nov. 23, 2021

(65) Prior Publication Data

US 2022/0093229 A1 Mar. 24, 2022

Related U.S. Application Data

(60) Provisional application No. 63/081,676, filed on Sep. 22, 2020.

(51) Int. Cl.
*G16H 20/13* (2018.01)
*G16H 10/60* (2018.01)
*G16H 50/20* (2018.01)

(52) U.S. Cl.
CPC ............. *G16H 20/13* (2018.01); *G16H 50/20* (2018.01); *G16H 10/60* (2018.01)

(58) Field of Classification Search
None
See application file for complete search history.

(56) References Cited

U.S. PATENT DOCUMENTS

| | | | |
|---|---|---|---|
| 8,383,579 B2* | 2/2013 | Kirsh | A61K 9/2072 514/360 |
| 11,367,519 B1* | 6/2022 | Heldman | G16H 40/63 |
| 11,404,145 B2* | 8/2022 | Saripalli | A61B 5/7267 |
| 2010/0119597 A1* | 5/2010 | Clarke | A61P 43/00 514/772.3 |
| 2021/0391081 A1* | 12/2021 | Goldner | G16H 10/60 |

FOREIGN PATENT DOCUMENTS

CN 109961315 A * 7/2019 ............. G06N 3/084

OTHER PUBLICATIONS

Ngiam, K. Y., & Khor, W. (2019). Big data and machine learning algorithms for health-care delivery. The Lancet Oncology, 20(5), e262-e273. (Year: 2019).*

* cited by examiner

*Primary Examiner* — Alaaeldin M. Elshaer
*Assistant Examiner* — Ashley Elizabeth Evans
(74) *Attorney, Agent, or Firm* — Barry Choobin; Patent 360

(57) ABSTRACT

An apparatus and method for calculating an optimum medication dose for a patient based on a multiplicity of factors that can affect the medical condition and thus the medication dose. The apparatus includes a trained machine learning based model that can calculate an optimum medication dose based on medication data, diagnostic data, biodata, and plurality of parameters affecting the medical condition. The apparatus can also include a dispenser for dispensing the calculated medication dose.

14 Claims, 4 Drawing Sheets

APPARATUS AND METHOD FOR CALCULATING AN OPTIMUM MEDICATION DOSE

CROSS-REFERENCE TO RELATED APPLICATIONS

This application claims priority from the U.S. provisional patent application Ser. No. 63/081,676, filed on Sep. 22, 2020, which is incorporated herein by reference in its entirety.

FIELD OF INVENTION

The present invention relates to an apparatus and method for dispensing a medication dosage and more particularly, the present invention relates to a method for determining an amount of medication dose for a medical condition based on physiological parameters and dispensing the determined amount of medication dose.

BACKGROUND

While prescribing medication, the medical professional calculates the medication dose for the patient. The medication dose refers to the amount of medicine that must be taken or administered in a single ingestion. It is important to take the right amount of medication to achieve the optimum therapeutic effect. An excess medication dose can have side effects while a less than required medication dose can produce sub-optimum therapeutic effects. The medication dose can depend upon multiple factors and these factors may vary from patient to patient and some of the factors may vary with time. For a patient, many factors can affect the medication dose, such as genetic, environmental, and psychological factors including anxiety, lifestyle, diet, other prescribed or non-prescribed medications, and exposure to air-borne or water-borne chemicals. Seasonal factors can also affect the medical condition and thus the optimum medication dose for the disease. For example, the blood pressure of a person may be affected by a variety of personal as well as environmental reasons.

Currently, medical practitioners rely on limited factors in calculating the medication dose for addressing the high blood pressure of a patient. Primarily, age and weight are considered in calculating the medication dosage. Other factors such as chronic kidney diseases and other medications taken by the patient can also be considered. The two parameters those medical practitioners generally rely on when adjusting the medication dose are infrequently measured blood pressure values and the patient's subjective response to the medication dose. This is quite often done on a trial-and-error basis.

Besides the direct effect of a particular medication on a subject, there may also be other environmental and external factors that may affect the subject's response, including changes in employment status, family relationships, special events, change in living location or travel, and even the cycle of week-day events.

Finally, the effects of other medications need to be considered to eventually come up with the right dose for a particular medical condition, such as blood pressure. Currently, there are no such models that could taken into consideration such interactions, which are themselves dependent on environmental and external factors, including changes in employment status, family relationships, special events, change in living location or travel, and even the cycle of week-day events.

It is thus desirable that instead of nominal, discrete unit medication dosage values contained in conventional dosage forms, the optimum medication dose can be calculated based on a set of recorded values reflecting directly or indirectly the variety of factors. This calculated and dispensed dosage to the patient would allow for optimal therapeutic effects.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to an apparatus and method for determining an optimum medication dose for a medical condition in a patient.

It is another object of the present invention that multiple factors including personal, physiological, and environmental factors can be considered in calculating the medication dose.

It is still another object of the present invention that the medication dose can be optimized periodically according to the changes in the multiple factors.

It is yet another object of the present invention that the optimum medication dose can be calculated for hypertension as the medical condition in patients and multiple factors affecting blood pressure can be measured directly or indirectly to monitor changes.

It is a further object of the present invention that the right amount of medication can be dispensed.

In one aspect disclosed is an apparatus and method for calculating an optimum medication dose for a patient based on a multiplicity of factors. The disclosed apparatus can receive as an input the prescription of the patient, diagnostic data, medical histories of the patient and his family members such as parents and siblings, and biodata of the patient. The biodata can include information about the lifestyle of the patient, planned life activities, gender, age, and genetic data. The disclosed apparatus can also monitor the activities of the patient, namely energy expenditure and the environment of the patient for determining the value of multiple parameters that can affect the medical condition and thus the medication dose. Based on such data, the apparatus can generate a model tailored to the physiological profile of the patient wherein this model can be used to calculate the optimum medication dose.

Herein, the definition of optimum is the minimum dose of medication that allows maintaining the blood pressure of the patients within predetermined range values. The predetermined range for blood pressure can vary from patient to patient and can be determined by the medical professional. Moreover, in the same patient, the predetermined range for blood pressure can vary with progress in the treatment. For example, the medical professional may decide that for a certain patient, the systolic BP can be within the range of 135-145 mmHg, whereas the diastolic values can be within 85-95 mmHg. As long as the recorded blood pressure values remain within the specified range, the blood pressure control result can be considered "optimum". It is understood that certain embodiments are directed to calculating optimum medication dose for hypertensive patients are for illustrative purposes only and other medical conditions are within the scope of the present invention In one aspect, the disclosed apparatus can continue monitoring the different parameters, diagnostic data, effect of the medicine on the patient, and like and based on changes over time, the model can be automatically updated, keeping the dispensed medication dose adjusted to the optimum medication dosage that can produce an optimum therapeutic effect in the patient.

In one aspect, the disclosed apparatus can dispense the calculated medication dose. This medication dose can vary in a much more granular way than what is permitted using pills for example, where the dispensing unit of medication is discrete.

In one aspect, disclosed is a method for calculating an optimum medication dose for a medical condition in a patient, the method implemented within an apparatus, the apparatus comprises a processor and a memory, wherein the method comprises the steps of: training, a machine learning-based medication dose model using at least diagnostic data, medication data, and biodata of a patient to determine a medication dose for a medical condition of the patient; storing the medication dose model in the memory; and processing the medication dose model, by the processor, based on at least current diagnostic data and current medication data of the patient for calculating a first medication dose.

In one implementation of the method, the method further comprises the steps of dispensing, by the apparatus, the calculated first medication dose.

In one implementation of the method, the method further comprises the steps of monitoring the diagnostic data, the medication data, and a plurality of parameters that affects the medical condition of the patient; updating the medication dose model based on changes in the medication data, the diagnostic data, and the plurality of parameters; and processing the updated medication dose model to calculate a second medication dose for the medical condition. The medical condition can be hypertension. The diagnostic data comprises systolic and diastolic blood pressure of the patient. The medication data comprises details of medicines taken by the patient. The biodata comprises genetic information, physiological information, gender, age, medical history, sleep habits, and physical activities. The plurality of parameters comprises quantified genetic information, medical history, quantified employment details, quantified mental state, energy expenditure, calories intake, partial oxygen, and carbon dioxide saturation levels in blood, and sleep patterns.

In one aspect, disclosed is an apparatus for dispensing calculated dose of medicine, sensors to determine values of different parameters affecting the medical condition, and processor to implement the above method.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
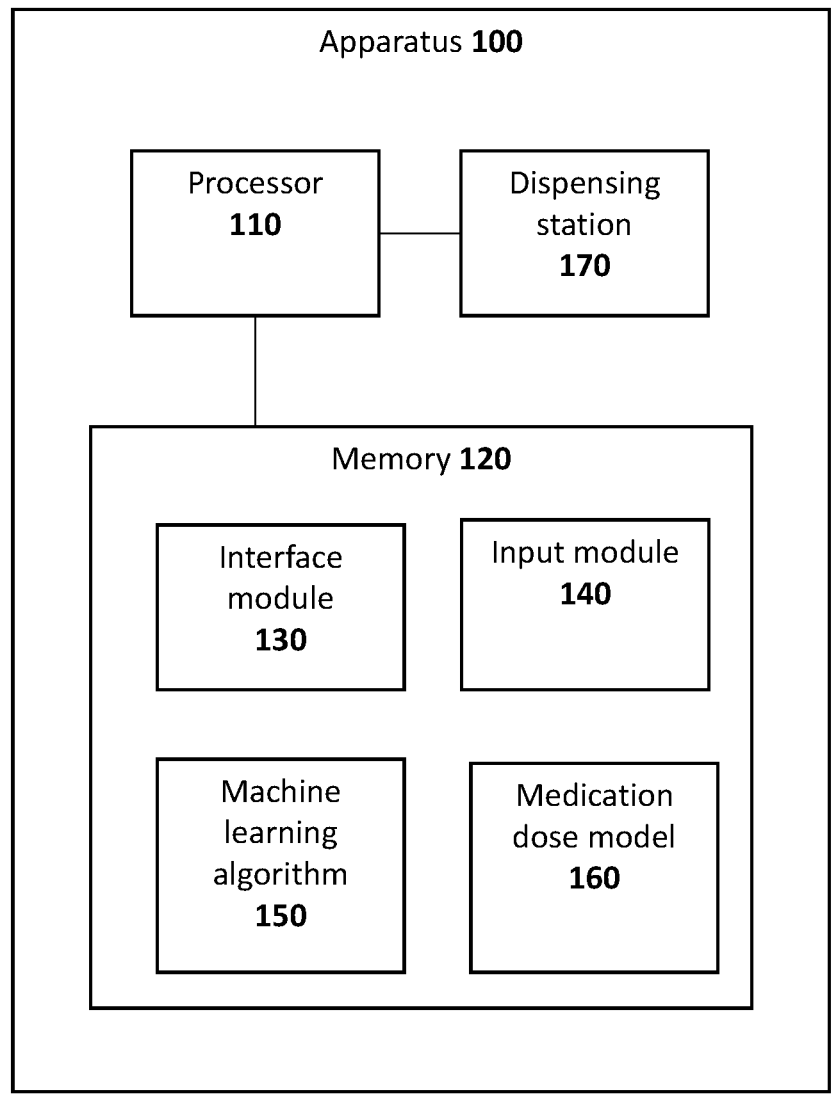
FIG. 1 is a block diagram showing an architecture of the system, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is an apparatus and method for calculating the medication dose to address hypertension for a patient based on different factors, such as physiological and lifestyle factors that can affect the disease or the medication dose. The disclosed apparatus can also dispense the calculated medication dose by combining small sub-units of the medication in different combinations. The disclosed apparatus and method can also monitor the different parameters for changes or trends over time and change the medication dose if required. In diseases like hypertension wherein, multiple factors can contribute to hypertension, the disclosed apparatus can provide better management of hypertension by optimizing the medication dose based on the multiple parameters and closely monitoring the effects of the medicine on the patient. Mental diseases like anxiety and depression which are greatly affected by the lifestyle and mood of a patient can also be managed better by optimizing the medication dose based on the actual needs of the patient. Similarly, lifestyle diseases such as diabetes which require management of glucose levels within predetermined limits could be better managed by optimizing the medication dose calculated based on the trends in blood glucose levels over time and physical activities of the patient.

Referring to FIG. 1 which shows a block diagram showing an exemplary embodiment of the disclosed apparatus 100. The apparatus can include a processor 110 which can be a desktop processor or an embedded processor. The functioning of a processor is to logically process information fetched from memory and is known to a skilled person. The apparatus 100 can also include a memory 120 that can be used to store data. The use of memory in computing devices is also known to a skilled person and hence not described here. The memory 120 can include an interface module 130 which upon execution by the processor can provide an interface for interacting with the patient, medical professionals, and/or technicians. The memory 120 may also include an input module 140 that can receive a prescription and other data/parameters that can affect the medical condition and the medication dose. The input module 140 is connected to a variety of sensors allowing the algorithm to have access to the required data to perform the tuning of the medication dose model 160 hence the calculation of the optimal medication dose. The memory 120 can include a machine learning algorithm 150 which upon execution by the processor can process the prescription and the data related to multiple parameters received by the input module 140 to train and update the medication dose model 160. The medication dose model 160 can be stored in the memory 120 and upon execution by the processor can calculate the optimum medication dose for the patient. Also, can be seen in FIG. 1 is a dispensing station 170 that can receive the calculated medication dose through the processor 110 and dispense the medicine in calculated continuous doses.

Figure 2:
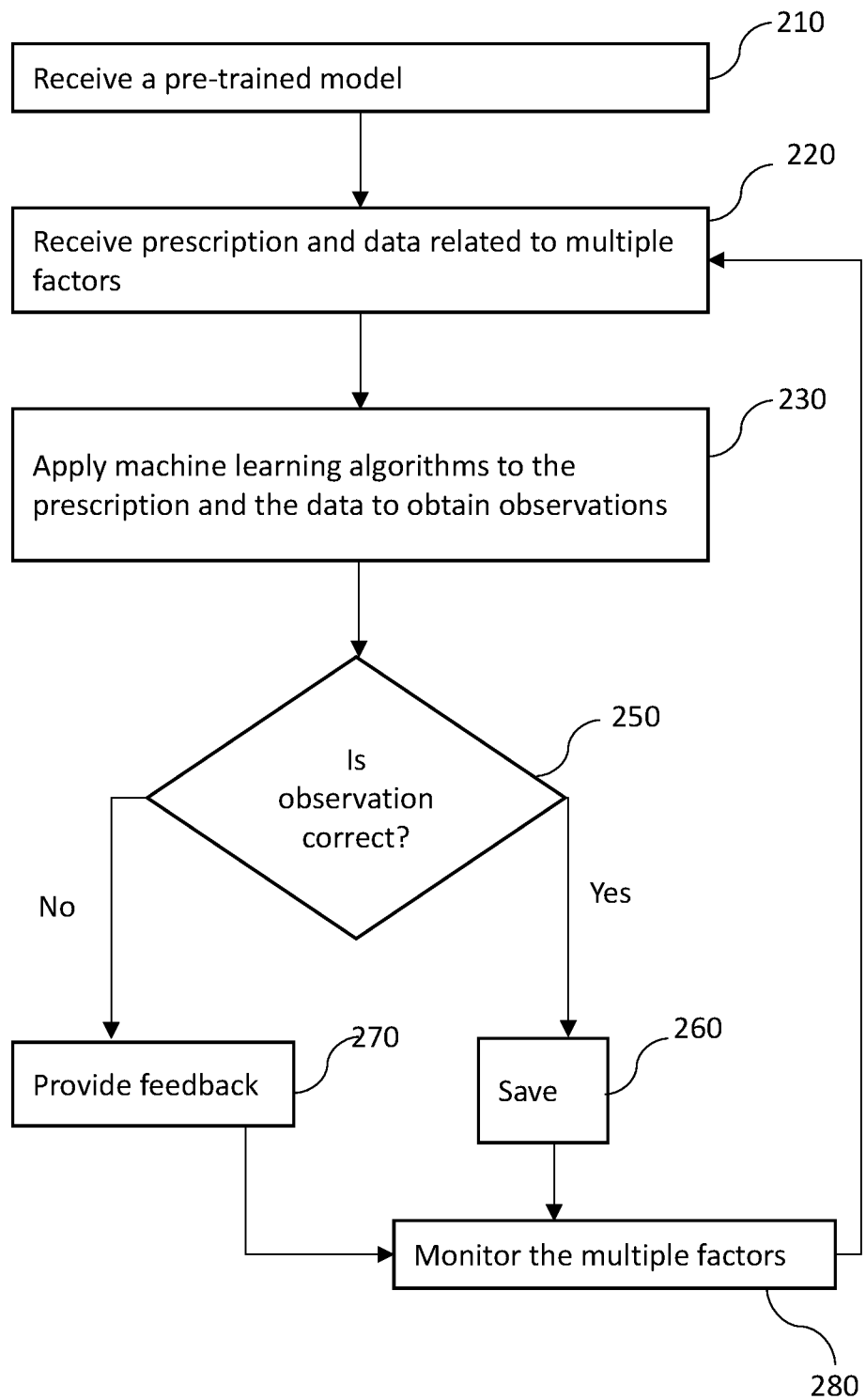
FIG. 2 is a flowchart illustrating steps in training the model, according to an exemplary embodiment of the present invention.

Referring to FIG. 2 which is a flow chart showing steps in training the medication dose model 160. First, a pre-trained model can be received at step 210. The medication dose model 160 can be pre-trained based on the theoretical and technical knowledge, medical data of patients, and optionally using test subjects. Theoretical and technical knowledge can include knowledge about the physiology of the body, diseases, medications, doses of medications, therapeutic doses, toxic dose level, side effects, gender, weight, height, and the like. Historical patient data can also be used in the training of the pre-trained medication dose model 160. The pre-trained model can be further personalized for each patient. The prescription data, diagnostic data, and data related to multiple parameters for a patient can be received at step 220. To adjust the medication dose model for a specific patient, the machine learning algorithms can be applied to the prescription and the data based on the pre-trained model to make observations, at step 230. The observations can also be the determining values of different parameters including medication doses. The observations can also be predicted blood pressure values based on the medication of the patient. The observations can be presented for checking at step 240. If an observation matches the criteria set by the medical professional at step 240, the same can be saved at step 250. Else, if the observation is outside the range specified by the medical professional at step 240, feedback can be provided that can help the machine learning algorithm to further adjust the model (learning), at step 270. For example, the predicted blood pressure can be compared with actual blood pressure. At each iteration, multiple factors are continuously monitored, and new data is created at step 280. Eventually, the medical dose model can be validated when the model can predict the values of the blood pressure over a significant period. This period can vary between a few days to a few weeks. During this time, the model can predict the blood pressure values within the range specified by the medical professional. The model calculates these predictions based on the medication taken by the patient and all other data that was input and recorded during this period.

Figure 3:
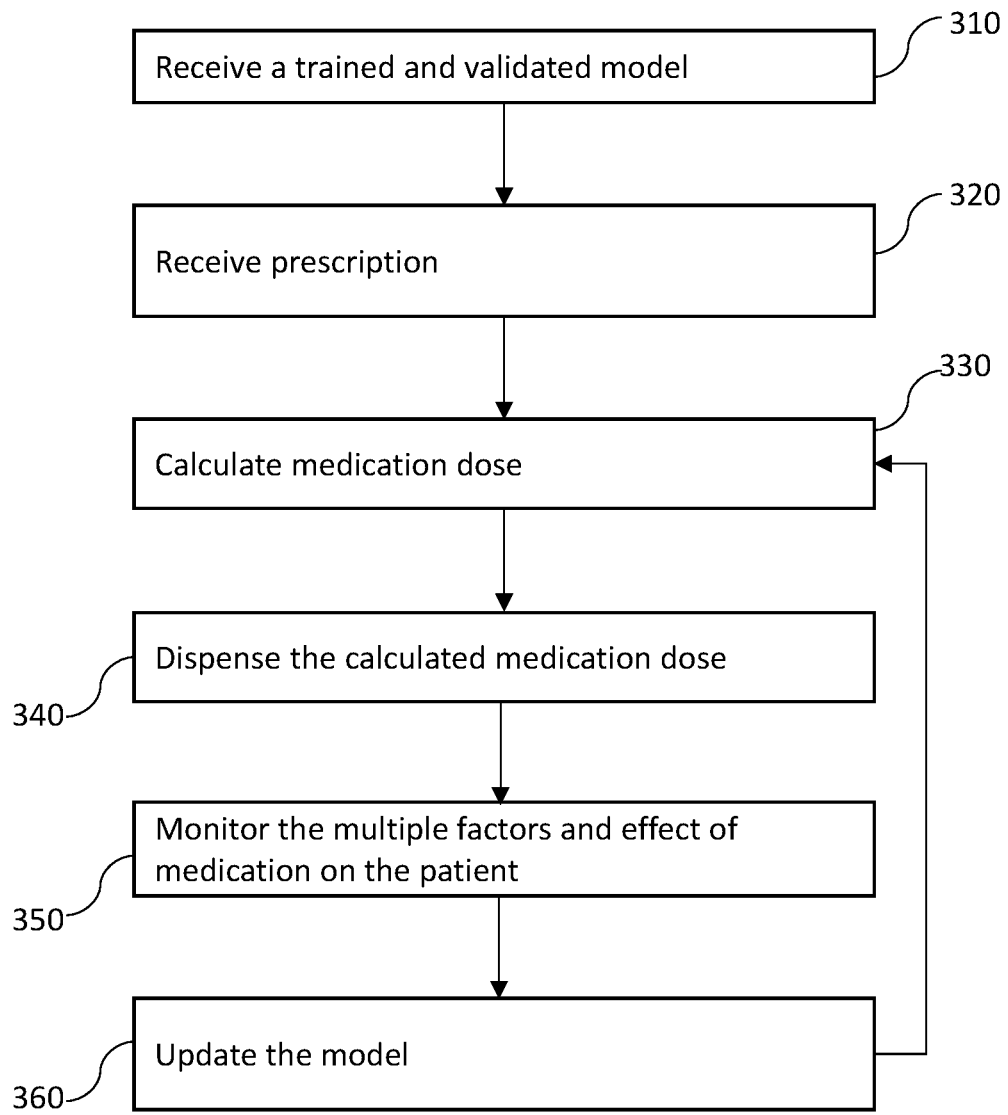
FIG. 3 is a flowchart illustrating steps of the method for calculating an optimum dose for a patient, according to an exemplary embodiment of the present invention.

Referring to FIG. 3 which shows steps in calculating the medication dose. Once the medication dose model 160 is trained and validated, it can be approved by the physician for use by the patient, at step 310. The same or new prescription can be received at step 320. Using the medication dose model 160, the medication dose can be calculated by the machine learning algorithms, at step 330. The calculated medication doses can then be dispensed by the dispensing station, at step 340. The apparatus can continue to monitor the multiple factors and the effects of medicine on the patient, at step 350. Based on the newly created data at step 350, the machine learning algorithms can update the medication dose model 160, at step 360 and the updated medication dose model 160 can be used to calculate subsequent medication doses.

In one exemplary embodiment, the multiple factors can include other medications taken by the patient and include prescribed and non-prescribed medications; supplements; herbal medicines and teas, vital signs, and physical activities; lifestyle activities; and the like. Each data point can be time-labeled, and the value of the data can be either accurately determined or approximated. Examples of accurate data can include the doses of medications, values of systolic and diastolic blood pressure, and saturated blood oxygen levels. Examples of approximated data can include physical activities, amount of food ingested, consumed calories, sleep, and stress. Such subjected data can be quantified based on predetermined rules. For example, the stress can be quantified on a scale of 1-5, wherein 1 is mild stress and 5 is extreme stress levels.

The machine learning algorithm can use all available time-series data as well as other biodata of the patient to create the data-driven medication dose model 160 which can be validated using data that has not been used for training. The training and validation of the model may take a few days and up to a few weeks so that at least a whole cycle of events can be covered, during which the machine learning algorithm can continuously compare the predicted values of the vital signs with the actual readings, given the current model parameters, the medication consumption, and activities. Once the model has been validated by the results of the predictions of the model being within the range indicated by the healthcare professional, it can be further reviewed by healthcare professionals for their approval.

A series of safety features can be implemented by (1) constantly comparing the desirable vital signs with the actual values, and (2) ensuring that the maximum and minimum values of mediation doses are dispensed so that if any significant discrepancy is noted between the predicted and actual values, the apparatus can alert the patient and request the intervention of a healthcare provider by sending all diagnostic and medication data, to prevent any under or overdose.

In one embodiment, the machine learning algorithm can include Deep Learning, whereas a significant amount of data is recorded to extract meaningful insights. The number and types of neurons in such algorithms are determined based on the complexity of the problem. As there are multiple implementations of such algorithms as part of a more general Artificial Intelligence realm, no further details are provided here.

Algorithms such as deep-learning that takes into consideration the physician's prescribed medications, time-labeled information such as vital signs data, frequently recorded blood pressure values, current and future lifestyle activities, consumed prescribed and non-prescribed medications, and food amount.

In one exemplary embodiment, the apparatus can dispense the calculated medication dose of medicine for the patient. The apparatus can include unit amounts of the medicine in desired physical form such as granule, syrup, and like. For example, 10 mg units of medicine can be present in the form of a granule. The granules can be combined to form a single medication dose for the patient. 300 mg of calculated medication dose can be formed by combining 30 units of 10 mg granules.

In one aspect, different types of sensors can be used to monitor vital signs, behavior, stress levels, sleeping habits, physical activity, environmental factors, and like factors from a patient. A survey type of questions can also be asked from the patient to determine the state of the patient, such as pain, anxiety levels, mood, and any external events affecting the mental state of the user. Sensors included in the form of a band or smartwatches are known that can measure and monitor various physical and psychological parameters and activities of a person in normal day-to-day life. These bands are easy to be wear and carry without affecting the daily actives of the persons. Also, such bands or smartwatches can monitor sleep habits. Any such sensor and bands known to a skilled person for measuring activities, physiological functions, vital signs, behaviors, and environmental factors related to a person are within the scope of the present invention for determining parameters for multiple factors that can affect the medication dose.

Figure 4:
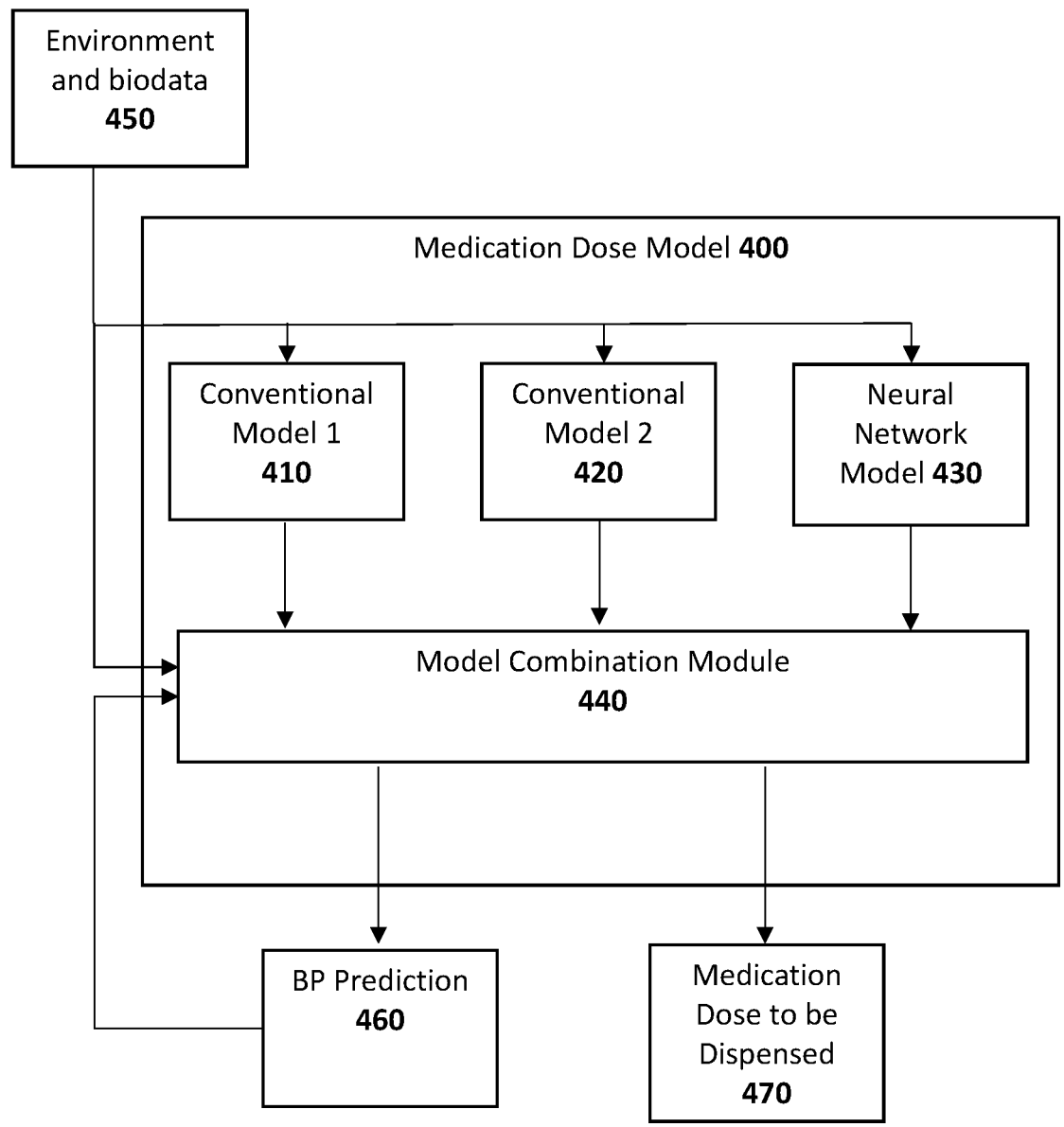
FIG. 4 is a block diagram illustrating the medication dose model, according to an exemplary embodiment of the present invention.

Referring to FIG. 4 which is a block diagram illustrating an exemplary embodiment of the medication dose model 400. The disclosed medication dose model 400 can be a neural-network-based model that can be complemented by other types of the conventional first order and second-order models (FIG. 4). A first-order model 410 is governed by a first-order differential equation, whereas a second-order model 420 is governed by a second-order differential equation. We envision combining the first-order model 410, the second-order model 420, and the neural network model 430 into a model combination module 440 with the data 450 acquired from the real world being used to adjust the weight of each section of the algorithm. It is envisioned as a hybrid model consisting of conventional (differential equations) as well as neural network models.

The advantage of the hybrid model be that the algorithm can adjust based on accurate or estimated values of the multiple parameters. During the training phase (phase I), the model can constantly adjust its internal structure and parameters to fit the patient's blood pressure data, so that it can predict with sufficient accuracy the blood pressure. The model can take input all types of data including multiple parameters affecting the blood pressure as described above and predict blood pressure values for the patient. The predicated or observed blood pressure values can be compared with the actual blood pressure values of the patient to obtain feedback. Once the model can produce the required predictions using data it has not used for training, the model can be validated. This is where the medical professional comes in and allows the model to take over in deciding the medication dose (Phase II). The algorithm can keep receiving different parameters and blood pressure data of the patient, and the algorithm is constantly trained with new data. As such, the algorithm adapts itself to the new conditions of the patient.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for calculating an optimum medication dose for a medical condition in a patient, the method implemented within an apparatus, the apparatus comprises a processor and a memory, the apparatus further comprises a wearable device and a dispensing station, wherein the wearable device comprises one or more sensors configured to monitor a plurality of parameters, wherein the plurality of parameters comprise values of systolic and diastolic blood pressure, saturated blood oxygen levels, quantified behavior, quantified stress levels, quantified sleeping habits, quantified physical activity, and quantified environmental factors,
  wherein the method comprises the steps of:
    creating and training, a machine learning-based medication dose model using at least diagnostic data, medication data, and biodata of the patient to determine a medication dose for the medical condition of the patient, wherein the at least diagnostic data, and the medication data are time-stamped for generated time-series data, wherein the machine learning-based medication dose model is a hybrid model consisting of a neural-network, first-order model governed by first-order differential equation, and a second-order model governed by a second-order differential equation, wherein diagnostic data from humans is used to adjust weight of each section of hybrid model, wherein training comprises:
    predicting by the machine learning-based medication dose model one or more parameters of the plurality of parameters as observations, wherein the observations comprise medication doses,
    matching the one or more predicted parameters with predetermined criteria or actual valves of the one or more predicted parameters,
    upon a match, saving the observations, and
    upon a non-match, providing a feedback for adjusting the machine learning-based medication dose model;
  storing the medication dose model in the memory;
  processing the medication dose model, by the processor, based on at least current diagnostic data and current medication data of the patient for determining a first medication dose;

dispensing, by the dispensing station of the apparatus, the determined first medication dose by combining sub-unit amounts of the medication in different dosage combinations; and predicting blood pressure of the patient based on medication of the patient.

2. The method according to claim 1, wherein the method further comprises the steps of:

upon calculating the first medication dose, monitoring the diagnostic data, the medication data, and the plurality of parameters that affect the medical condition of the patient;

updating the medication dose model based on changes in the medication data, the diagnostic data, and the plurality of parameters; and processing the updated medication dose model to determine a second medication dose for the medical condition.

3. The method according to claim 2, wherein the medical condition is hypertension.

4. The method according to claim 3, wherein the diagnostic data comprises systolic and diastolic blood pressure of the patient.

5. The method according to claim 4, wherein the medication data comprises details of medicines taken by the patient.

6. The method according to claim 5, wherein the biodata comprises genetic information, physiological information, gender, age, medical history, sleep habits, and physical activities.

7. The method of claim 2, wherein the first medication dose and the second medication dose are for maintaining blood pressure of the patient within a predetermined range values.

8. The method according to claim 1, wherein the subunits of the medication are in the form of granules each of a predefined weight.

9. An apparatus for calculating the optimum medication dose for a medical condition in a patient, the apparatus comprises:

a wearable device, wherein the wearable device comprises a plurality of sensors configured to monitor a plurality of parameters in the patient, wherein the plurality of parameters comprises values of systolic and diastolic blood pressure, saturated blood oxygen levels, quantified behavior, quantified stress levels, quantified sleeping habits, quantified physical activity, and quantified environmental factors;

a dispenser for dispensing a calculated medication dose; and a processor and a memory, wherein the processor is operably coupled to the memory, the processor configured to implement a method comprising the steps of:

training, a machine learning-based medication dose model stored in the memory using a machine learning algorithm also implemented with the apparatus, using at least diagnostic data, medication data, biodata, and the plurality of parameters of the patient to determine a medication dose for the medical condition of the patient, wherein the at least diagnostic data, and the medication data are time-stamped for generated time-series data, wherein the machine learning-based medication dose model is a hybrid model consisting of a neural-network, first-order model governed by first-order differential equation, and a second-order model governed by a second-order differential equation, wherein diagnostic data from humans is used to adjust weight of each section of hybrid model, wherein training comprises:

predicting by the machine learning-based medication dose model one or more parameters of the plurality of parameters as observations, wherein the observations comprise medication doses, matching the one or more predicted parameters with predetermined criteria or actual valves of the one or more predicted parameters, upon a match, saving the observations, and upon a non-match, providing a feedback for adjusting the machine learning-based medication dose model, receiving current values of the plurality of parameters from the plurality of sensors, and processing by the medication dose model, based on at least current diagnostic data, current medication data, and the current values of the plurality of parameters of the patient for determining a first medication dose; and dispensing, by the dispenser, the determined first medication dose by combining sub-unit amounts of the medication in different combinations.

10. The apparatus according to claim 9, wherein the method further comprises the steps of: upon calculating the first medication dose, monitoring the diagnostic data, the medication data, and the plurality of parameters that affect the medical condition of the patient, updating the medication dose model based on changes in the medication data, the diagnostic data, and the plurality of parameters, and processing the updated medication dose model to determine a second medication dose for the medical condition, wherein the first medication dose and the second medication dose are for maintaining blood pressure of the patient within a predetermined range values.

11. The apparatus according to claim 10, wherein the medical condition is hypertension.

12. The apparatus according to claim 11, wherein the diagnostic data comprises systolic and diastolic blood pressure of the patient.

13. The apparatus according to claim 12, wherein the medication data comprises details of medicines being taken by the patient.

14. The apparatus according to claim 13, wherein the biodata comprises genetic information, physiological information, gender, age, medical history, sleep habits, and physical activities.

* * * * *